INVENTORS.
JOHN THOMAS STEPHAN
ARCHIE L. LOMAX

BY Mattis and Graybeal

ATTORNEYS

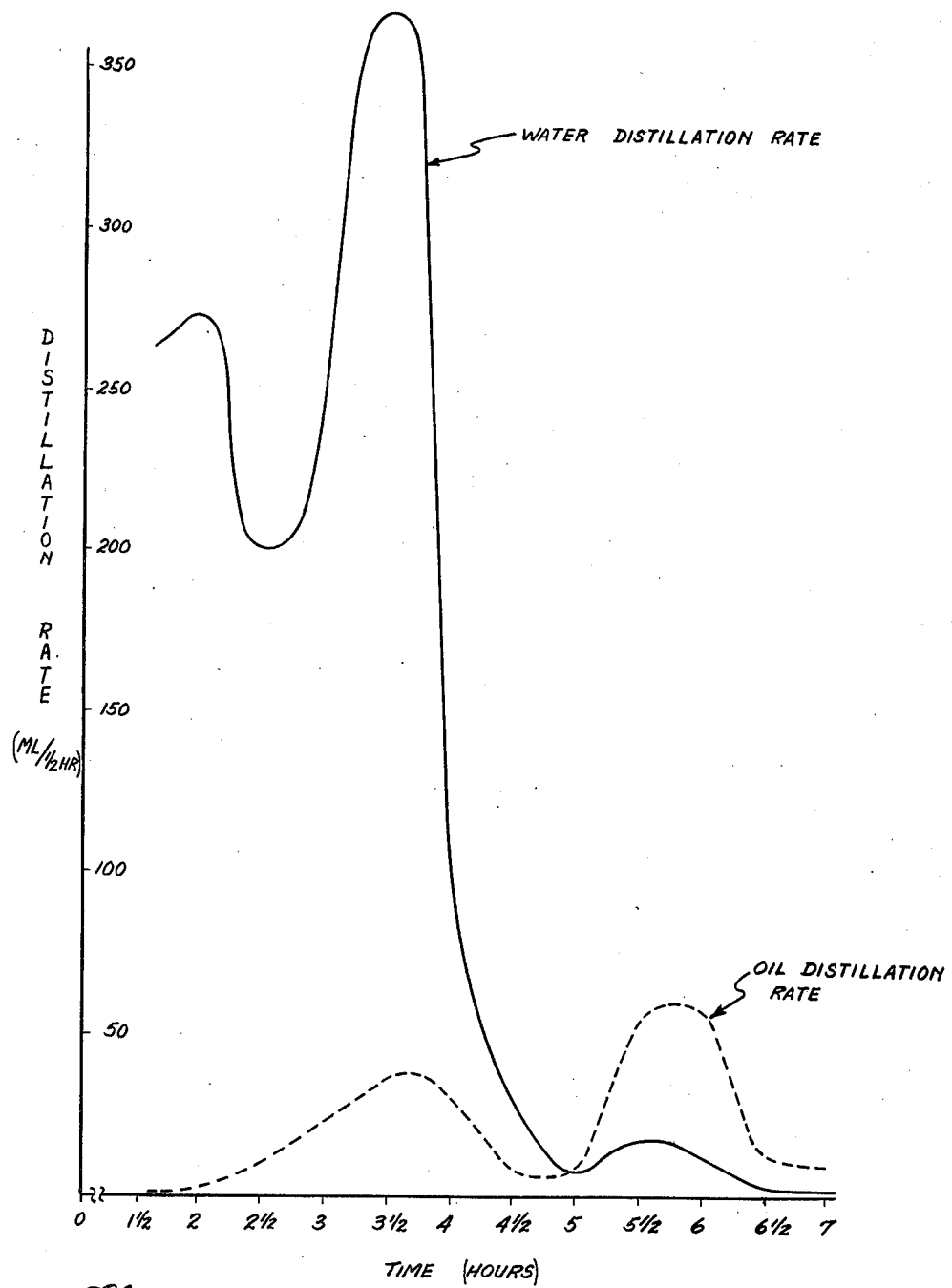

# United States Patent Office 3,499,939
Patented Mar. 10, 1970

3,499,939
PROCESS FOR PRODUCTION OF DIALKALI METAL RESORCINATE
John Thomas Stephan, Longview, Wash., and Archie L. Lomax, Kelso, Wash., assignors to Stepan Chemical Company, Northfield, Ill., a corporation of Delaware
Continuation-in-part of application Ser. No. 268,259, Mar. 27, 1963. This application July 18, 1966, Ser. No. 565,791
Int. Cl. C07c 37/04, 37/00
U.S. Cl. 260—628                5 Claims

ABSTRACT OF THE DISCLOSURE

Dialkali metal resorcinate production by fusion reaction of an aqueous alkali metal hydroxide and an alkali metal benzene disulfonate in the presence of a hydrocarbon oil characterized by a boiling point range providing that an initial fraction of the hydrocarbon oil progressively co-distills with at least some of the solvent water and with the reaction water evolved when the disulfonate and hydroxide react to form dialkali metal resorcinate, the co-distillation of hydrocarbon oil and water taking place on an uninterrupted basis and in the presence of a substantial fraction of nondistilling, higher boiling point hydrocarbon oil remaining after the dialkali metal resorcinate forming reaction is essentially complete. The resulting oil suspension of molten dialkali metal resorcinate is cooled and stirred to form an oil slurry containing solid, finely divided resorcinate particles which are then separated from the oil as by filtering in a substantially oxygen-free atmosphere, the separated resorcinate particles then being washed with an aqueous solution to form a slurry of particulate inorganic alkali metal salts in an aqueous medium in which the resorcinate is dissolved. The inorganic salts are then separated from the resorcinate containing solution, followed by the removal of the residual hydrocarbon oil therefrom. Continuous presence of codistilling oil during progressive removal of solvent water and reaction water, and the existence of the disulfonate as a water-in-oil suspension of very finely divided particles avoids so-called "bumping" during the fusion reaction.

---

Figure 1:
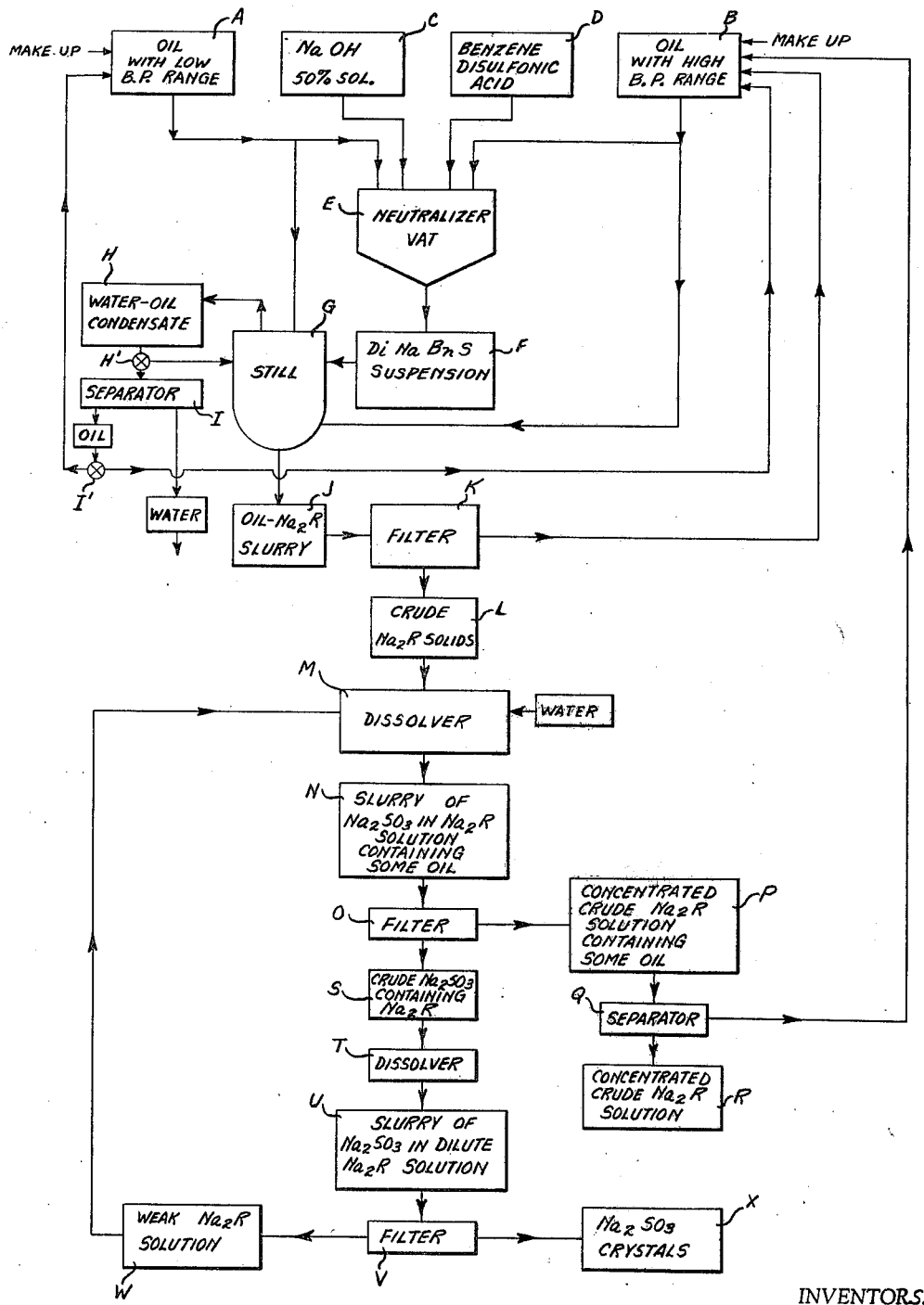

This application is a continuation-in-part of our co-pending and now abandoned application Ser. No. 268,259, entitled, Dialkali Metal Resorcinate Production Process and Products Formed Thereby, and filed Mar. 27, 1963.

Certain aspects of this invention relate to improvements in the production of dialkali metal resorcinate by the substitution or so-called "fusion" reaction of an alkali metal hydroxide and an alkali metal benzene disulfonate in the presence of water and a hydrocarbon oil, the mixture being a water-in-oil suspension for ease of handling, and the hydrocarbon oil being characterized by a boiling point range whereby the last part of the solvent water is distilled off with an initial fraction of the oil, leaving the resorcinate and alkali metal sulfite containing fusion reaction mass in suspension in a non-distilling fraction of the hydrocarbon oil. Other aspects of the invention relate to the preliminary formation of the alkali metal benzene disulfonate in the presence of the oil medium, and further relate to the efficient cooling of the molten fusion reaction mass by introduction of further hydrocarbon oil while maintaining the reaction mass mechanically agitated in a pumpable state, i.e., as an oil slurry of finely divided solid particles, for ease of handling during subsequent separation of the reaction products.

Preliminary to the substitution reaction, the dialkali metal benzene disulfonate used as the fusion reactant can be advantageously formed from crude benzene disulfonic acid solution (containing minor amounts of benzene monosulfonic acid and sulfuric acid) to which is added a hydrocarbon oil or mixture of oils having both low boiling point range and high boiling point range, the disulfonic acid and oil mixture being then neutralized by a suitable alkalizing reactant such as sodium hydroxide solution or the like. To avoid the formation of a substantial phenolate content, the benzene disulfonic acid solution employed in the fusion reaction should have a very low monosulfonic acid content, such as is characteristic of the product disclosed and claimed in our U.S. Pat. No. 3,227,750, granted Jan. 4, 1966, and entitled, Process for the Production of Benzene Disulfonic Acid, and Product Recovered Therefrom.

During the strongly exothermic neutralization reaction, the oil phase present aids in dissipating the heat produced, in that water can vaporize more readily from the emulsified mass, and heat is absorbed to a considerable extent by the oil itself.

Hydrocarbon oil present during and after neutralization, prevents the solidification of a crystal mass, the mixed alkali metal sulfonates and sulfate salts are thus maintained in a pumpable, slurry state. It is not a requirement that all of the oil be added prior to the neutralization since it is possible to add some of it simultaneously with the neutralizing caustic or even in some cases after the major addition of the neutralizing caustic. By having oil present at the time of the neutralization of the benzene disulfonic acid, and by maintaining the cooling mass stirred, the conditions are optimum for the formation of a water-in-oil suspension of very finely divided particles. If the oil phase is not continuous, difficulties ensue in carrying out the fusion reaction on a commercial scale due to the formation of bad scale deposits on heated surfaces causing so-called "bumping," with consequent frothing, poor heat transfer, charring of the product, etc.

The oil vehicle for the neutralization and fusion reactions can be any hydrophobic liquid which has a suitable boiling point range and which is preferably substantially non-reactive towards the alkali metal hydroxide. The oil should have an uninterrupted boiling point range to in part distill over with the last portion of the solvent water to vaporize and in part also distill over with the water of reaction formed during the resorcinate forming reaction. A substantial oil fraction should also be present which does not distill over under the conditions of temperature and pressure used to remove the reaction water so as to remain with the resorcinate. This oil fraction, coupled with stirring of the mass, produces a pumpable slurry which is readily handleable when the mass is cooled down below the fusion point of the salt mixture present.

In carrying out the fusion reaction, the oil suspension of dialkali metal benzene disulfonate, together with slightly more than a stoichiometric amount of alkali metal hydroxide (the latter either as solid hydroxide or more preferably as the concentrated water solution of the hydroxide), are charged to a heated still. It is an important feature and result of the invention that the disulfonate-caustic substitution reaction, occurring while the fusion reactants are in oil suspension, is capable of producing resorcinate yields of 95% or better on a commercial scale.

In order to conserve the energy liberated as heat of neutralization, it is advisable to charge the reactants to the still immediately after neutralization. In this way the heat of neutralization is effectively utilized in heating the still charge partially toward the distillation point of the oil under the pressure used. It is usual to operate the still at atmospheric pressure; however, either a higher pressure or a partial vacuum may be used as deemed expedient by engineering considerations.

The still can be a simple so-called pot still constructed of mild steel according to A.S.T.M. Standards. Corrosion is not a factor since at all times the oily phase is the continuous phase, thereby greatly minimizing corrosion and for practical purposes eliminating it. The still can be heated by any convenient means such as by direct gas firing or by electrical heating elements.

With the disulfonate-caustic-oil charge in the still, heat is applied and the temperature of the charge is progressively increased. From about 100° C. to about 250° C. the solvent water (e.g. the water accompanying the alkali metal hydroxide, such as the water present when 50% caustic soda solution is used) progressively distills over, the last part of the solvent water coming off with an initial fraction of the oil. The reaction commences and the water of reaction begins distilling off at approximately 275° C. (in the preferred examples involving the reaction of disodium benzene sulfonate and sodium hydroxide), with the water of reaction continuing to distill off with rise in temperature until the substitution reaction is completed. Completion of the reaction occurs at a temperature ranging from about 320° C. to about 370° C. In this range, it is preferable to favor a relatively high final reaction temperature to improve the resorcinate yield.

The water of reaction can be recovered by using a suitable condenser, and the amount of water recovered is indicative of the completeness of the substitution reaction. When about two moles of water are recovered per mole of disulfonate present the reaction is practically completed. Where substantial amounts of mono- or polysulfonated derivatives are present, a corresponding correction should be made in the amount of recoverable reaction water. The oil fraction which is recovered along with the reaction water is separated therefrom and can be recycled to the still to reduce the total oil requirement.

It is to be noted that the fire hazard occasioned by the distillation of hydrocarbon oil above its flash point is greatly minimized if not entirely eliminated by the smothering blanket of steam (i.e., water vapor) codistilling.

At the conclusion of the substitution reaction the heating of the still is stopped and the reaction products are cooled. As indicated, a preferred technique for cooling the reaction product is by evaporative cooling with use of additional hydrocarbon oil. To effect this manner of cooling the condenser setting is changed from a position of full distillation to a position of complete reflux, with return of all condensate to the still. When this is accomplished, a quantity of hydrocarbon oil containing at least a substantial fraction having a low boiling point range (e.g., less than about 200° C.) is admitted to the still and allowed to at least in part distill off and reflux. This effectively cools the reaction mass and simultaneously reduces the effective viscosity or consistency of the reaction mass-oil mixture. The cooling is allowed to proceed and, depending on the nature of the resorcylic bodies produced, the inorganic salts and the alkalis present, a coalescence occurs below about 300° C. and usually between about 200° C. and 300° C. With stirring of the mass during cooling thereof, a fine grained solid phase containing the sodium salt of the resorcylic body develops in suspension in the liquid oil phase. Slow stirring is preferable, such as by stirring of the mass at not over about 100 r.p.m. with an anchor type stirrer, the blade span of which is not more than about 25% of the still diameter. The resulting fine, sandlike product (in some cases the dispersion is so complete that it has the appearance of an oil base paint) containing dialkali metal resorcinate is then separated from the oil by filtration, centrifugation or settling.

The separated solids are then suspended in a minimum quantity of hot water whereby any occluded oil is separated and the salt mixture separated into an alkali metal sulfite solid phase and a concentrated dialkali metal resorcinate containing aqueous phase. We prefer to use the weak solution of dialkali metal resorcinate which is obtained from the washing of the recovered alkali metal sulfite crystals in the subsequent step of dissolving the resorcinate, instead of simply using hot water. By so doing we essentially completely recover the dialkali metal resorcinate occluded with the alkali metal sulfite crystals.

It is an important feature of the invention that the oil has an uninterrupted boiling point range, since if the oil has an interrupted boiling point range which just includes the distilling range of the reaction water, there is a gap or delay between the distillation of the solvent water and the distillation of the reaction water-oil mixture which gives rise to intense overheating with accompanying bumping and frothing when the distillation of the water-oil begins. Thus, there is a significant oil fraction or phase which overlaps the distillation range of the last part of the solvent water and the entire part of the distillation range of the reaction water whereby frothing and bumping are inhibited. The amount of low boiling point oil necessary to achieve smooth distillation need not be over about 40% of the total oil and can be as little as about 10% of the total oil. Therefore, by way of specific example, the hydrocarbon oil employed in the reaction of sodium benzene disulfonate with sodium hydroxide at substantially atmospheric pressure, should be constituted to have fractions providing an uninterrupted boiling point range at temperatures from about 140° C. to at least about 360° C., with such fractions making up from about 10% to 95%, and preferably at least about 40% of the total oil.

These and other objects, features and characteristics of the invention will be apparent from the following discussion and examples, taken together with the accompanying illustrations, wherein:

FIG. 1 is a flow sheet diagram indicating material movement and process steps illustrative of the invention, by means of which a concentrated solution of crude disodium resorcinate is produced, together with by-product sodium sulfite crystals; and FIG. 2 is a graphical presentation illustrating the respective water distillation rate and oil distillation rate as a function of distillation time.

Materials movements and the general nature of the process will first be discussed, in conjunction with FIG. 1, without particular regard to material quantities. Following this general discussion, two specific examples are given, including specific material quantities and more particular data as to reaction conditions.

Referring to FIG. 1, the neutralizer vat E is charged with a mixture of oil from storage A and oil from storage B, together with sodium hydroxide (50% solution) from storage C. Storage A contains oil of predominantly low boiling point range, and storage B contains oil of predominantly high boiling point range. Then, with adequate stirring to give a thorough mixture of the oils and sodium hydroxide solution, benzene disulfonic acid from storage D is added in a thin stream. The heat of reaction of the benzene disulfonic acid and the sodium hydroxide soon raises the temperatuer of the mass in the neutralizer E to the boiling point, and subsequent additions of benzene disulfonic acid produce copious quantities of steam which flash off instantaneously. Addition of benzene disulfonic acid is continued until all thereof desired for the reaction has been added to the mass in neutralizer vat E. The neutralization product as discharged from neutralizer vat E is a crude water-in-oil suspension principally containing sodium hydroxide and disodium benzene disulfonate (denoted DiNaBns in FIG. 1). This suspension, designated F in FIG. 1 for purposes of identification, is charged while hot to the still G. Heat is applied to still G, and water and oil distill off as the temperature rises, the distillate being condensed in condenser H. The water-oil condensate in condenser H is delivered through open valve H' to a phase separator I, separating the condensate water from the condensate oil. As indicated in FIG. 1, the condensate water is discharged, and the condensate oil is returned to storage A or storage B through valve I', as appropriate.

At the conclusion of the distillation operation, i.e., when all of the water contained in product F plus all or essentially all of the water of reaction resulting from the fusion of the sodium hydroxide and disodium benzene disulfonate in product F are distilled off, the heating of the still G is discontinued and additonal oil is added to cool still G, such addition being made directly from storage A and/or storage B, as desired. Cooling of the still G is preferably accomplished principally by vaporization of the lower boiling point oil fractions so it is usually preferable to use as cooling oil an oil containing predominantly low boiling point fractions, e.g., oil from storage A. When cooling in this manner, valve H' is shifted to return the condensate from condenser H to still G and refluxing of the cooling oil is allowed to continue until the temperature of still G is well below the fusion point of the resorcyclic bodies produced (usually between 150° C. and 200° C.). When the still G has cooled to this extent, valve H' is again shifted to deliver the condensate to separator I and the volatile fractions distilling off are returned through valve I' to storage A and/or storage B, as appropriate. The slurry mixture of hot oil and crude disodium resorcinate solids remaining in the still G is then discharged therefrom and subjected to a separation operation in filter K. The resulting oil filtrate, being predominantly fractions of high boiling point range, is returned to oil storage B. In FIG. 1, the slurry mixture of oil and disodium resorcinate is identified for simplicity as an oil-Na₂R slurry and designated as product J for purposes of identification.

The crude disodium resorcinate solids obtained from filter K (and designated product L in FIG. 1) contain occluded oil from which the disodium resorcinate is to be separated. For this purpose, the product L has hot water added thereto in dissolver M. A suitable operating temperature for dissolver M is about 65° C., and hot water is added to the product L therein in the amount of between about 25–45 lbs. water for each 100 lbs. of product L. Under these conditions, sodium sulfite is the insoluble phase and the disodium resorcinate and other sodium salts as well as the sodium hydroxide are the solute phase. The product N out of dissolver M is a slurry of sodium sulfite crystals in a crude disodium resorcinate solution containing a small amount of hydrotropically dissolved and colloidally dispersed oil. This product N is in turn filtered in filter O at about 60° C. The resulting filtrate product, designated P, is a concentrated solution of crude disodium resorcinate containing soluble sodium salts plus a small amount of oil. Upon cooling to room temperature or below in separator Q, the oil separates and is returned to storage B, and the remaining concentrated crude disodium resorcinate solution R can be drawn off from separator Q and is ready for commercial usage, either directly in salt form, or after "springing" to resorcinol, in a manner known per se.

The precipitate byproduct of crude sodium sulfite crystals obtained from filter O, which product is designated S in FIG. 1, contains absorbed disodium resorcinate solution which it is desirable to recover. The crude sodium sulfite crystals S are suspended in hot water at a suitable temperature (e.g., 65° C.) in dissolver T, with about 30–50 lbs. of hot water being added for each 100 lbs. of product S. The resulting slurry, designated U, is comprised of sodium sulfite crystals in dilute disodium resorcinate solution of about 10–25% strength. This slurry is subjected to filtration in filter V, the filtrate providing a weak solution of disodium resorcinate, designated W, which is advantageously returned to the dissolver M for use as makeup water in processing a subsequent batch of product L. The sodium sulfite crystals obtained from filter V, designated X in FIG. 1, are a valuable byproduct of the process.

To further illustrate a process of the present invention, the following examples provide further quantitative and equipment details incident to experimental production typifying our process.

EXAMPLE I

Crude benzene disulfonic acid was prepared according to the technique disclosed in our aforesaid U.S. Patent No. 3,227,750. On analysis this product was shown to contain the following constituents:

| | Percent |
|---|---|
| Meta benzene dilsulfonic acid | 87.2 |
| Benzene monosulfonic acid | 1.7 |
| Sulfuric acid | 7.8 |
| Char and sulfones | 1.3 |
| Sodium sulfate | 2.0 |

735.4 grams of this benzene disulfonic acid was added to a mixture of 1515 grams of 50% aqueous sodium hydroxide solution, 842 grams of water, and 1720 grams of a hydrocarbon oil mixture consisting of two parts by volume of the hydrocarbon oil identified as Process Oil 1P, and one part by volume of Richfield Turbine Fuel A. The indicated mixture of Process Oil 1P and Turbine Fuel A is a primarily aliphatic hydrocarbon oil having at atmospheric pressure an uninterrupted boiling point range commencing at about 188° C., with a 10% fraction distilling below about 216° C. and a 50% fraction distilling below about 339° C.

The acid-caustic-oil mixture was reacted in neutralizer vat E, and the heat of neutralization raised the temperature of the mass to its boiling point, after which an additional 3210 grams of the Process Oil 1P was added and the mixture was heated in an electrically heated steel still G equipped with a turbine stirrer and a condenser H. The still G was 8" in diameter and 10" deep with a flat bottom and top and was made from ⅛" steel. The turbine stirrer had 6 blades, each 2⅝" in diameter, ¾" in height, and 1" wide. The still G had three 1" wide baffles built into it, and the turbine stirrer operated at 1000 r.p.m. Electric resistance heaters of 4 kw. total capacity were wrapped around the outside of the still G, and the heating rate was such that the still G and its contents were heated to 140° C. in 25 minutes. The water of solution began distilling over to condenser H at about 140° C., and 5 hours were required to raise the temperature of the still G from 140° C. to 285° C. At this point the original water of solution had all distilled over to condenser H. Another 2 hours were required to raise the temperature of the mass in still G from 285° C. to 362° C. During this time 1722 grams of reaction water distilled over along with 603 grams of oil. Left in the still G was 5695 grams of the slurry J. This slurry J was allowed to cool to 30° C. overnight while being constantly stirred. This slurry J was then filtered in filter K in the substantial absence of oxygen, the filter K utilized being a pressure leaf filter operated at 30 p.s.i using nitrogen as the pressurizing gas and using grade No. 271A Reeves Angel filter paper marked by the American Filter Paper Company. 3520 grams of oil were recovered and returned to oil storage B, and 2220 grams of filter cake (product L) were obtained from the filter K. The product L was then suspended in 1080 grams of water and stirred thoroughly while held at 75° C. in dissolver M. The resulting slurry (product N) was allowed to cool to 20° C. and was then filtered on a pressure leaf filter O at 30 p.s.i, also using nitrogen as the pressurizing gas and equipped with the type of filter paper above indicated. The resulting filtrate (product P) upon separation in separator Q produced 789 grams of oil (returned to storage B) and 1612 grams of aqueous disodium resorcinate solution, which upon analysis was found to contain 322 grams of disodium resorcinate. The filter cake from filter O (product S) weighed 832 grams and upon analysis was found to contain 17.2% moisture and 5 grams of disodium resorcinate, with the residue being principally sodium sulfite. The recovery of disodium resorcinate (product R) was 77.7% (on a molar basis) of the benzene disulfonic acid charged. The molar ratio of sodium hydroxide charged to the fusion reaction was 4.52, based on the disodium benzene disulfonate charged, as compared with a theoretical requirement of 4.0.

EXAMPLE II

The crude benzene disulfonic acid employed in this example was also obtained by the technique disclosed in our aforesaid U.S. Pat. No. 3,227,750, and had the following analysis:

|  | Percent |
|---|---|
| Benzene disulfonic acid | 81.5 |
| Benzene monosulfonic acid | Nil |
| Sulfuric acid | 5.5 |
| Char and sulfones | 1.23 |
| Sodium sulfate | 2.16 |

583 grams of this benzene disulfonic acid was mixed with 1154 grams of 50% sodium hydroxide solution, 747 grams of water, and 4000 grams of Process Oil 1P. Process Oil 1P is a primarily aliphatic hydrocarbon oil having at atmospheric pressure an uninterrupted boiling point range commencing at about 299° C., with a 10% fraction distilling off below about 332° C., with a 50% fraction distilling off below about 352° C., and with a 90% fraction distilling off below about 355° C.

The temperature of the emulsion F discharged from neutralizer E was 80° C. This emulsion was charged to the still G as in Example I and heat was applied. The molar ratio of caustic-to-disulfonate of the charge to the still G was 4.9.

The following Table 1 shows the progression of temperature, total oil and total water distilled during the course of the experiment. The graphical presentation afforded by FIG. 2 correspondingly shows the variation in temperature and the distillation rates of the water and oil constituents as the experiment progressed.

TABLE 1

| Time | Temperature (° C.) | Total oil distilled (cc.) | Total water distilled (cc.) |
|---|---|---|---|
| 9:30 | 95 | None | None |
| 10:00 | 130 | None | None |
| 10:30 | 141 | 7 | 112 |
| 11:00 | 144 | 8 | 374 |
| 11:30 | 150 | 9 | 647 |
| 12:00 | 161 | 19 | 847 |
| 12:30 | | | |
| 1:00 | 215 | 55 | 1,215 |
| 1:30 | 255 | 85 | 1,320 |
| 2:00 | 275 | 92 | 1,350 |
| 2:30 | 318 | 99 | 1,358 |
| 3:00 | 350 | 153 | 1,376 |
| 3:30 | 359 | 210 | 1,388 |
| 4:00 | 358 | 222 | 1,390 |
| 4:30 | 350 | 232 | 1,392 |
| Total 7 hrs. | | 232 | 1,392 |

As will be noted in FIG. 2, the initial distillate is almost entirely water during the first 2½ hours of distillation, with most but not all of the solvent water being removed during this period.

It is also notable from the data presented by the above table that a substantial amount of the oil is distilled off during the first two and a half hours even though the temperature of the emulsion in the still is substantially below the temperature at which the oil per se would begin to yield a distillate fraction (299° C.). The lower temperature oil distillation indicated in the table results from a carry-over by the water being distilled off in relatively large quantities by the phenomenon known as steam distillation. The lower limit of the boiling point range of the oil phase is thus effectively materially lowered in the presence of the distilling water of solution so that the oil boiling point range effectively spans the temperature of vaporization of at least the residual part of the solvent water even though the data with respect to the boiling point range of the oil mixture when subject to distillation in the absence of water might be thought to indicate otherwise.

During the next 2 hours of distillation (i.e., at time 2½–4½ hours), water continues to distill off at a substantial rate and a substantial amount of the oil also distills off, at a progressively increasing then decreasing rate. The oil fraction distilling off during this time serves to aid in carrying over the residual solvent water. At the end of this distillation phase (i.e., at time 4½–5 hours in FIG. 2), the solvent water and essentially all of the low boiling point fraction of the oil have been distilled off. It is important to note, in FIG. 2, that there is not a sharp break or "gap" in either the oil distillation rate or water distillation rate. The distillation is thus uninterrupted so that the distillation process continues to be "smooth," i.e., does not "bump." As the temperature of the reaction mixture is further increased, during the period of time from about 5 to about 6½ hours, the oil distillation rate again rises sharply as the higher boiling point fraction distills off, and the water distillation rate also rises to some extent, evidencing removal of the water formed by the reaction. The substantial oil distillation rate functions to scavenge or "sweep" the water of reaction from the reaction mass and effect substantially complete removal of the reaction water. Removal of water is substantially complete after about 6½ hours reaction time, in the example presented by FIG. 2 and the above table, and the reaction is stopped after 7 hours. At this point, it is also important to note there is a significant residual oil content, as evidenced by the substantial oil distillation rate at the time the reaction is stopped. This residual oil, which can also be termed nondistilling oil, aids in rendering the reaction mixture readily mixable with the subsequently added cooling oil.

After a reaction time of 7 hours, the mixture in the still was stirred and had added thereto sufficient oil (about 1,000 grams) from oil storage A to cool the reaction mass well below the fusion temperature thereof. With continued stirring the mass was then allowed to further cool by natural radiation and convection over a period of 14 hours until a temperature of about 30° C. was reached. The sandy slurry resulting (product J) was then filtered as before except that a somewhat higher nitrogen pressurization was employed (45 p.s.i. gage). The oil filtrate recovered amounted to 3235 grams, and was returned to storage B. The filter cake (product L) weighed 1640 grams and analyzed 34.3% sodium sulfite. This filter cake was leached in 800 grams of hot (80° C.) water in dissolver M and was allowed to cool to about 25° C. then filtered in filter O in like manner as before. The resulting filtrate weighed 1204 grams and upon analysis was shown to contain (in addition to the water of solution) 17.7% disodium resorcinate, 3.3% sodium sulfiate, 2.85% sodium hydroxide, and no sodium phenate. This analysis corresponds to 214 grams of disodium resorcinate, or a yield of 69.4%, based upon the amount of benzene disulfonic acid charged to the reaction. This product can of course be placed in commerce either in aqueous solution or in dried form. The absence of any phenate content is an important characteristic of this product in that the product does not have the toxicity customarily encountered in crude resorcinate as a consequence of a substantial phenate content therein. Handling difficulties are as a result considerably reduced, and the quality of resorcinol resins manufactured therefrom can be improved since phenolic impurities are thus avoidable.

EXAMPLE III

The crude benzene disulfonic acid employed in this example was also obtained by the technique disclosed in our aforesaid U.S. Patent No. 3,227,750, and has the following analysis:

| | Percent |
|---|---|
| Benzene disulfonic acid | 82.73 |
| Benzene monosulfonic acid | Nil |
| Sulfuric acid | 8.56 |
| Char and sulfones | 2.22 |
| Sodium sulfate | 1.97 |
| Water | 4.52 |

737 grams of this benzene disulfonic acid was mixed with 390 grams of sodium sulfite, 834 grams water, and 25 grams of a 50% sodium hydroxide solution to form 1622 grams of neutral liquor with the evolution of sulfur dioxide gas. The 1622 grams of neutral liquor was mixed with 925 grams of 50% sodium hydroxide solution, and 3600 grams of Process Oil 1P, then charged to the still as in Examples I and II.

The still was the heated and the following Table 2 shows the progression of temperature, total oil and total water distilled, and oil additions during the course of the experiment.

TABLE 2

| Time (hrs.) | Temp. (° C.) | Oil Ml. | Oil Total | Water Ml. | Water Total |
|---|---|---|---|---|---|
| 0 | 40 | | | | |
| ½ | 106 | | | | |
| 1 | 146 | | 3 | | 35 |
| 1:30 | 154 | 15 | 18 | 241 | 276 |
| 2 | 163 | 22 | 40 | 244 | 520 |
| 2:30 | 176 | 20 | 60 | 196 | 716 |
| 3:30 | 230 | 92 | 152 | 352 | 1,068 |
| 3:40 | 235 | (700 gms. oil added) | | | |
| 4 | 259 | 39 | 191 | 61 | 1,129 |
| 4:30 | 292 | 28 | 219 | 32 | 1,161 |
| 5 | 322 | 15 | 234 | 18 | 1,179 |
| 5:30 | 346 | 104 | 338 | 25 | 1,204 |
| 6 | 364 | 68 | 406 | 7 | 1,211 |
| 6:30 | 373 | 50 | 456 | | 1,211 |
| 7 | 370 | | 456 | | 1,211 |
| 7:10 | 325 | (1,500 gms. oil added) | | | |
| 7:40 | 308 | | 456 | | 1,211 |
| | | (Cooled and stirred overnight) | | | |
| 23 | 50 | | 456 | | 1,211 |

At the conclusion of the fusion reaction and cooling of the reaction product, the still was free from any trace of adhering solid material and the reaction product was in the form of an oil slurry. Upon removal of the oil (with 4281 grams oil being recovered) a filter cake weighed 2254 grams and upon analysis was found to include 31.3% $Na_2SO_3$ by weight. This oily cake was washed with 1000 grams of hot water and the resulting $Na_2R$ liquor weighed 1498 grams (with 21.4% R) and the wet cake weighed 826 grams. The $Na_2R$ liquor was sprung with 290 grams of 99% $H_2SO_4$ (and 150 grams wash water), yielding 1099 grams of 23.2% resorcinol solution, the resorcinol in this solution providing about a 90.7% yield as compared on a molar basis with the resorcinate charged to the still. Titration analysis of the wet cake indicated a 29.9-gram resorcinate content therein. Re-extraction of the wet cake and full recovery of the resorcinate revealed a total resorcinol yield of about 97.6%, as compared on a molar basis with the resorcinate charged to the still.

The above Example III, in addition to the above-noted high yield, further demonstrates that our process is susceptible to use of sodium sulfite as the alkalizing reactant in the disulfonic acid neutralization without any adverse effect on the resorcinol yield. The process can thus employ one of its own byproducts as one of the starting materials and thereby affords a considerable practical advantage in material handling in a production plant.

It will be apparent that various commercially available oils and mixtures thereof can be employed to provide the oil phase characteristic of our process. The important consideration with respect to the oil is that, as previously indicated, the oil provide fractions distilling with the residual solvent water and with the reaction water on an uninterrupted basis, with a nondistilling fraction being left to provide the oil phase present during the handling and separation of the reaction products. In this regard, simply by way of further nonlimitive example, diesel oil can be mixed with Process Oil 1P in about equal proportions, giving an oil vehicle having a boiling point range starting at about 260° C., with a 10% fraction distilling off below about 294° C. and with a 50% fraction distilling off below about 346° C. Another suitable oil mixture for the process can be composed of 1.4 volumes of Shell Pale Oil 300 and 1 volume of Shell Pale Oil 400, which mixture exhibits a boiling point range starting at about 309° C., with a 10% fraction distilling off below about 360° C. and with a 50% fraction distilling off at about 386° C. Another suitable oil is Shell Ondina 133, a primarily aliphatic hydrocarbon oil exhibiting a boiling point range starting at 80° C., with a 10% fraction distilling off below about 310° C. and a 50% fraction distilling off below about 340° C. Yet another example of a suitable oil mixture is a mixture of 2 parts Shell Ondina 122 and 1 part kerosene, having a boiling point range starting at about 72° C., with a 10% fraction distilling off at about 360° C. and with a 50% fraction distilling off at about 392° C.

Practice of the process on a commercial basis involves recycling of the oil to successive reaction batches (as shown at FIG. 1). During continued use the oil can vary substantially in its boiling point range. Any change in the boiling point range of the oil vehicle, and incidental loss of the vehicle can readily be corrected by appropriate quality control testing procedures and suitable "make up" to correct any constituent and/or quantity deficiency.

While it is presently preferred to cool the reaction mass in the still G at the completion of the substitution reaction by means of an oil which volatilizes (i.e., "flashes off" to reduce cooling time), it will be apparent that our process is compatible with use of other cooling techniques if desired, such as by jacketing the still with a refrigerant, or by introduction to the still of a cooling gas, for example.

Alkalizing reactants other than an alkali metal hydroxide such as sodium hydroxide can be used as the neutralizing agent for the benzene disulfonic acid, the important consideration in this respect being that a volatile inorganic neutralization product be formed. Thus, the alkalizing reactant can be an alkali metal hydroxide or any of the various alkali metal carbonates, the various alkali metal sulfites, and the various mixtures thereof, and the term "alkalizing reactant" is employed herein in this context. Similarly, it will also be understood that the term "alkali metal" as employed herein refers to the atomic Table Group IA metals in cationic form, of which sodium, potassium and lithium are the most practical, in the order named, from the point of view of cost.

In the step of separating the disodium resorcinate solids from the suspending oil, it is essential that such step be accomplished in the absence of oxygen. Disodium resorcinate is extremely reactive towards molecular oxygen at room temperature (15° C.) and above. Where filtration is performed at elevated temperatures such as 200° C., it is unsafe to use air as the pressurizing medium.

Air blowing to remove oily filtrate from the disodium resorcinate filter cake is extremely hazardous since the disodium resorcinate and oil react with the air to completely destroy the disodium resorcinate with the production of large volumes of smoke, leaving a carbonaceous residue in the filter. Even at temperatures of 30° C. (where the filtration is so time consuming as to be impractical because of the viscosity of the oil), use of air as the pressurizing medium causes the reaction with the disodium resorcinate to go forward with sufficient development of heat to melt the wire screen supporting the filter cloth in a pressure leaf filter. With sufficient air contact, total destruction of the disodium resorcinate results. Smaller amounts of air, while not completely destroying the disodium resorcinate, result in the formation of an extraordinary amount of unusable tar. Whether the tar is due to an oxygen catalyzed tar-producing polymerization of the disodium resorcinate or the reaction of the disodium resorcinate with intermediate oxidation products to give a tar, is not fully understood. However, the necessity of keeping oxygen away from the disodium resorcinate is clearly indicated. This requirement is surprising in view of the large quantities of sodium sulfite present, which is a well-known anti-oxidant.

Centrifugation as a unit operation for separating the disodium resorcinate from the suspending oil is only feasible where an inert atmosphere can be maintained. Suitable inert gases such as nitrogen, methane, natural gas, argon and the like, may be employed to provide the oxygen-free atmosphere contemplated by the present invention during cooling and filtration of the reaction mass and reaction products.

During the fusion reaction and the cooling of the mass after fusion, the necessary inert atmosphere is essentially provided by the oil vapor present and water vapor from the reaction. However, nitrogen or similar inert gas can also be used to insure the maintenance of an oxygen-free atmosphere at this stage of the process, as well.

Other various equivalents and analogous reactions, oily vehicles, and atmospheres can be employed in the practice of the invention, within the scope of the following claims.

What is claimed is:

1. The process for the production of dialkali metal resorcinate, comprising: mixing an alkali metal hydroxide with a dialkali metal benzene disulfonate in molar ratio of less than about 5:1; suspending the dialkali metal benzene disulfonate and alkali metal hydroxide mixture in a hydrocarbon oil having an uninterrupted boiling point range from not more than about 140° C. to at least about 370° C.; progressively heating the mixture up to a temperature in the range of about 320° C. to about 370° C. to cause reaction of the disulfonate and hydroxide to form dialkali metal resorcinate; and cooling the resulting oil suspension of molten dialkali metal resorcinate while mechanically stirring same to form an oil slurry containing solid, finely divided resorcinate particles.

2. The process of claim 1, wherein the molar ratio of the hydroxide and disulfonate mixture charged to the reaction is in the range of from about 4.25:1 to 4.5:1.

3. The process of claim 1, wherein the alkali metal hydroxide is sodium hydroxide.

4. The process of claim 1, further comprising: filtering the resorcinate particles from the oil in a substantially oxygen-free atmosphere; washing the separated resorcinate particles with an aqueous solution to form a slurry of particulate inorganic alkali metal salts in an aqueous medium in which the resorcinate is dissolved; separating the inorganic alkali metal salts from the resorcinate containing solution; and removing residual oil from the resorcinate solution.

5. The process of claim 4, wherein the atmosphere consists essentially of pressurized nitrogen gas.

References Cited

UNITED STATES PATENTS

| | | | |
|---|---|---|---|
| 2,111,973 | 3/1938 | Kokatnur | 260—628 |
| 2,334,488 | 11/1943 | Harris et al. | 260—628 |

BERNARD HELFIN, Primary Examiner

W. B. LONE, Assistant Examiner

U.S. Cl. X.R.

260—625